US012273366B2

(12) United States Patent
Bansal

(10) Patent No.: US 12,273,366 B2
(45) Date of Patent: Apr. 8, 2025

(54) RISK BASED SESSION RESUMPTION

(71) Applicant: Zscaler, Inc., San Jose, CA (US)

(72) Inventor: Abhinav Bansal, San Jose, CA (US)

(73) Assignee: Zscaler, Inc., San Jose, CA (US)

( * ) Notice: Subject to any disclaimer, the term of this patent is extended or adjusted under 35 U.S.C. 154(b) by 289 days.

(21) Appl. No.: 17/539,816

(22) Filed: Dec. 1, 2021

(65) Prior Publication Data

US 2023/0171280 A1    Jun. 1, 2023

(51) Int. Cl.
*H04L 9/40* (2022.01)

(52) U.S. Cl.
CPC .......... *H04L 63/1433* (2013.01); *H04L 63/12* (2013.01); *H04L 63/14* (2013.01); *H04L 63/10* (2013.01)

(58) Field of Classification Search
CPC ......... H04L 63/10; H04L 63/12; H04L 63/14; H04L 63/1416; H04L 63/1433
See application file for complete search history.

(56) References Cited

U.S. PATENT DOCUMENTS

| | | | |
|---|---|---|---|
| 9,621,574 B2 | 4/2017 | Desai et al. | |
| 9,935,955 B2 | 4/2018 | Desai et al. | |
| 10,225,740 B2 | 3/2019 | Bansal et al. | |
| 10,243,997 B2 | 3/2019 | Desai et al. | |
| 10,404,733 B1 * | 9/2019 | Shavell | ............... H04L 63/1433 |
| 10,579,794 B1 * | 3/2020 | Gates | .................... G06F 3/0604 |
| 10,708,233 B2 | 7/2020 | Goyal et al. | |
| 11,295,015 B1 * | 4/2022 | Roundy | ................. G06F 21/567 |
| 2003/0200202 A1 * | 10/2003 | Hsiao | ................... G06F 21/6218 |
| 2009/0055912 A1 * | 2/2009 | Choi | .................... H04L 63/0807 726/6 |
| 2017/0223024 A1 | 8/2017 | Desai et al. | |
| 2017/0289136 A1 * | 10/2017 | Ramalingam | ........... H04L 63/18 |
| 2017/0331859 A1 | 11/2017 | Bansal et al. | |
| 2018/0198791 A1 | 7/2018 | Desai et al. | |
| 2019/0081981 A1 | 3/2019 | Bansal | |
| 2019/0158503 A1 | 5/2019 | Bansal et al. | |
| 2019/0332790 A1 * | 10/2019 | Kukehalli Subramanya ............... G06F 21/33 |
| 2020/0067949 A1 | 2/2020 | Bansal et al. | |
| 2020/0077265 A1 | 3/2020 | Singh et al. | |
| 2020/0110870 A1 * | 4/2020 | Girdhar | ................. G06F 21/316 |
| 2020/0322414 A1 * | 10/2020 | Ashraf | ................ H04L 63/1416 |
| 2021/0105275 A1 | 4/2021 | Bansal et al. | |
| 2021/0135869 A1 * | 5/2021 | Barhudarian | ........... G06F 21/62 |
| 2021/0234860 A1 | 7/2021 | Bansal et al. | |

(Continued)

*Primary Examiner* — Jeong S Park
(74) *Attorney, Agent, or Firm* — Baratta Law PLLC; Lawrence A. Baratta, Jr.; Matthew R. Gore

(57) ABSTRACT

The present disclosure relates to systems and methods for risk-based session resumption. The present disclosure addresses the security gaps in the access control workflow of an organization while significantly enhancing the user experience. Instead of users being inquired to reauthenticate at a periodic interval, the present disclosure provides risk-based session resumption and reauthentication established on a verdict determination based on changes detected in metadata. The present disclosure not only prevents unnecessary prompts for user to authenticate again but also improves the security profile of an organization as users need to reauthenticate only if something has changed, malicious activity is detected, and there is a real risk to access control.

20 Claims, 6 Drawing Sheets

(56) References Cited

U.S. PATENT DOCUMENTS

2021/0288973 A1\* 9/2021 Dimble ............... H04W 12/108
2021/0390170 A1\* 12/2021 Olden .................... H04L 63/08

\* cited by examiner

US 12,273,366 B2

RISK BASED SESSION RESUMPTION

FIELD OF THE DISCLOSURE

The present disclosure relates generally to networking and computing. More particularly, the present disclosure relates to systems and methods for risk-based session resumption.

BACKGROUND OF THE DISCLOSURE

A shift towards a landscape of upwardly mobile consumers, remote workers, Bring Your Own Device (BYOD) policies and a globally geo-dispersed workforce, has continued to stretch many organizations' attack surfaces even wider than before. With this increased attack surface, service providers are tasked with identifying user identities and providing access to authenticated users. If misconfigured and tuned improperly, it is possible for threat actors to evade detection controls altogether or for false positives to appear. However, even when configured properly, there is a noticeable gap in latency of notification, contextual awareness, and Signal-to-Noise Ratio (SNR) of logs is often too low, noisy, and hard to decipher actionable signals without considerable indexing, querying and data mining. All of which takes a considerable amount of time to process, resulting in a weak defense mechanism. Identity Providers (IDP) conventionally do not have visibility into what users are actually doing in the cloud services during a session. They can only confirm that the user is who they say they are and provide them access, such as for a period of time.

With the advent of BYOD and work from home situations, there has been an increase of roaming devices as users are no longer in the enterprise trusted network. For such roaming users, applications servers typically authenticate users using various forms of authentication such as username, password, and client certificates along with various forms of multifactor authentication schemes such as biometrics and one-time-passwords on the user's mobile devices. Post authentication, clients usually store a session cookie with a specific timeout generated by the server in their cache. As long as the cookie is not expired, the client will connect with the server and the server will continue to provide access to the requested resources unconditionally. This poses significant security challenges because if the timeout for the session cookie is very long, then an attacker may abuse the access. On the extreme end, if the timeout is much less for example 1 hour, then it will hamper the user experience as every hour a user will have to reauthenticate to gain access to the server resources. This problem poses a specific risk for always-on VPNs which are configured usually to authenticate once and keep it running forever, thereby allowing an authenticated user to access resources for infinity.

BRIEF SUMMARY OF THE DISCLOSURE

The current disclosure overcomes this issue by proposing a risk-based session resumption and reauthentication workflow where the server will challenge the user to authenticate only if the risk score of the client requesting a resource has crossed a threshold of change. While this is distinctly useful for always-on VPNs, in practice the risk-based session resumption can be utilized universally for any long-lived Transport Layer Security (TLS) connection.

The present disclosure relates to systems and methods for risk-based session resumption. The present disclosure addresses the security gaps in the access control workflow of an organization while significantly enhancing the user experience. Instead of users being inquired to reauthenticate at a periodic interval, the present disclosure provides risk-based session resumption and reauthentication established on a verdict determination based on changes detected in metadata. The present disclosure not only prevents unnecessary prompts for user to authenticate again but also improves the security profile of an organization as users need to reauthenticate only if something has changed, malicious activity is detected, and there is a real risk to access control.

In an embodiment, the present disclosure includes a method implemented by a user device, the method including steps of: requesting a resource, by an agent operating on the user device, from a server, the resource is associated with any of an online application and a cloud service; prompting the user for identity; receiving user input for the identity and metadata, and providing the user input and metadata to the server for an authentication request; receiving and storing a session cookie for the resource, wherein the user device has a session for the resource based on the session cookie; and for subsequently requesting the resource, providing the session cookie and changes in the metadata to the server; and receiving a response from the server based on the changes in the metadata, and accessing the resource based thereon. Accessing the resource based thereon includes one of resuming the session, blocking the session, and reauthenticating the session. Reauthenticating the session is one of with or without multifactor authentication. The metadata may include an internet protocol (IP) address, and wherein, when there is a change in the IP address, the response includes accessing the resource via reauthenticating the session. The metadata may include details related to the user device and wherein, when there is a change in the details, the response includes accessing the resource via reauthenticating the session with multifactor authentication. The metadata may include installed applications on the user device and wherein, when there is a change in the installed applications to include a malicious application, the response includes blocking the resource. The metadata may include any of details related to the user device, internet protocol (IP) address, network configuration, installed applications, installed certificates, geolocation, and network type. The accessing the resource based thereon may include resuming the session based on minor changes to the metadata.

In another embodiment, the present disclosure includes a non-transitory computer-readable medium including instructions that, when executed, cause a processor to perform the steps of: requesting a resource, by an agent operating on a user device, from a server, the resource is associated with any of an online application and a cloud service; prompting the user for identity; receiving user input for the identity and metadata, and providing the user input and metadata to the server for an authentication request; receiving and storing a session cookie for the resource, wherein the user device has a session for the resource based on the session cookie; for subsequently requesting the resource, providing the session cookie and changes in the metadata to the server; and receiving a response from the server based on the changes in the metadata, and accessing the resource based thereon. The accessing the resource based thereon includes one of resuming the session, blocking the session, and reauthenticating the session. The reauthenticating the session is one of with or without multifactor authentication. The metadata may include an internet protocol (IP) address, and wherein, when there is a change in the IP address, the response includes accessing the resource via reauthenticating the session. The metadata may include details related to the user device and wherein, when there is a change in the details, the response includes accessing the resource via reauthenticating the session with multifactor authentication. The metadata may include installed applications on the user device and wherein, when there is a change in the installed applications to include a malicious application, the response includes blocking the resource. The metadata may include any of details related to the user device, internet protocol (IP) address, network configuration, installed applications, installed certificates, geolocation, and network type. The accessing the resource based thereon may include resuming the session based on minor changes to the metadata.

In a further embodiment, the present disclosure includes a user device including: a processing device; a memory device configured to store a computer program having instructions that, when executed, cause the processing device to perform the steps of: requesting a resource, by an agent operating on a user device, from a server, the resource is associated with any of an online application and a cloud service; prompting the user for identity; receiving user input for the identity and metadata, and providing the user input and metadata to the server for an authentication request; receiving and storing a session cookie for the resource, wherein the user device has a session for the resource based on the session cookie; for subsequently requesting the resource, providing the session cookie and changes in the metadata to the server; and receiving a response from the server based on the changes in the metadata, and accessing the resource based thereon. The resource based thereon includes one of resuming the session, blocking the session, and reauthenticating the session. The metadata may include details related to the user device and wherein, when there is a change in the details, the response includes accessing the resource via reauthenticating the session with or without multifactor authentication. The metadata may include an internet protocol (IP) address, and wherein, when there is a change in the IP address, the response includes accessing the resource via reauthenticating the session.

BRIEF DESCRIPTION OF THE DRAWINGS

The present disclosure is illustrated and described herein with reference to the various drawings, in which like reference numbers are used to denote like system components/method steps, as appropriate, and in which:

FIG. 3 is a block diagram of a server that may be used in the cloud-based system of FIGS. 1 and 2 or the like.

FIG. 4 is a block diagram of a user device that may be used with the cloud-based system of FIGS. 1 and 2 or the like.

DETAILED DESCRIPTION OF THE DISCLOSURE

Again, the present disclosure relates to systems and methods for risk-based session resumption. The present disclosure addresses the security gaps in the access control workflow of an organization while significantly enhancing the user experience. Instead of users being inquired to reauthenticate at a periodic interval, the present disclosure provides risk-based session resumption and reauthentication established on a verdict determination based on changes detected in metadata. The present disclosure not only prevents unnecessary prompts for user to authenticate again but also improves the security profile of an organization as users need to reauthenticate only if something has changed, malicious activity is detected, and there is a real risk to access control.

§ 1.0 Example Cloud-Based System Architecture

Figure 1:
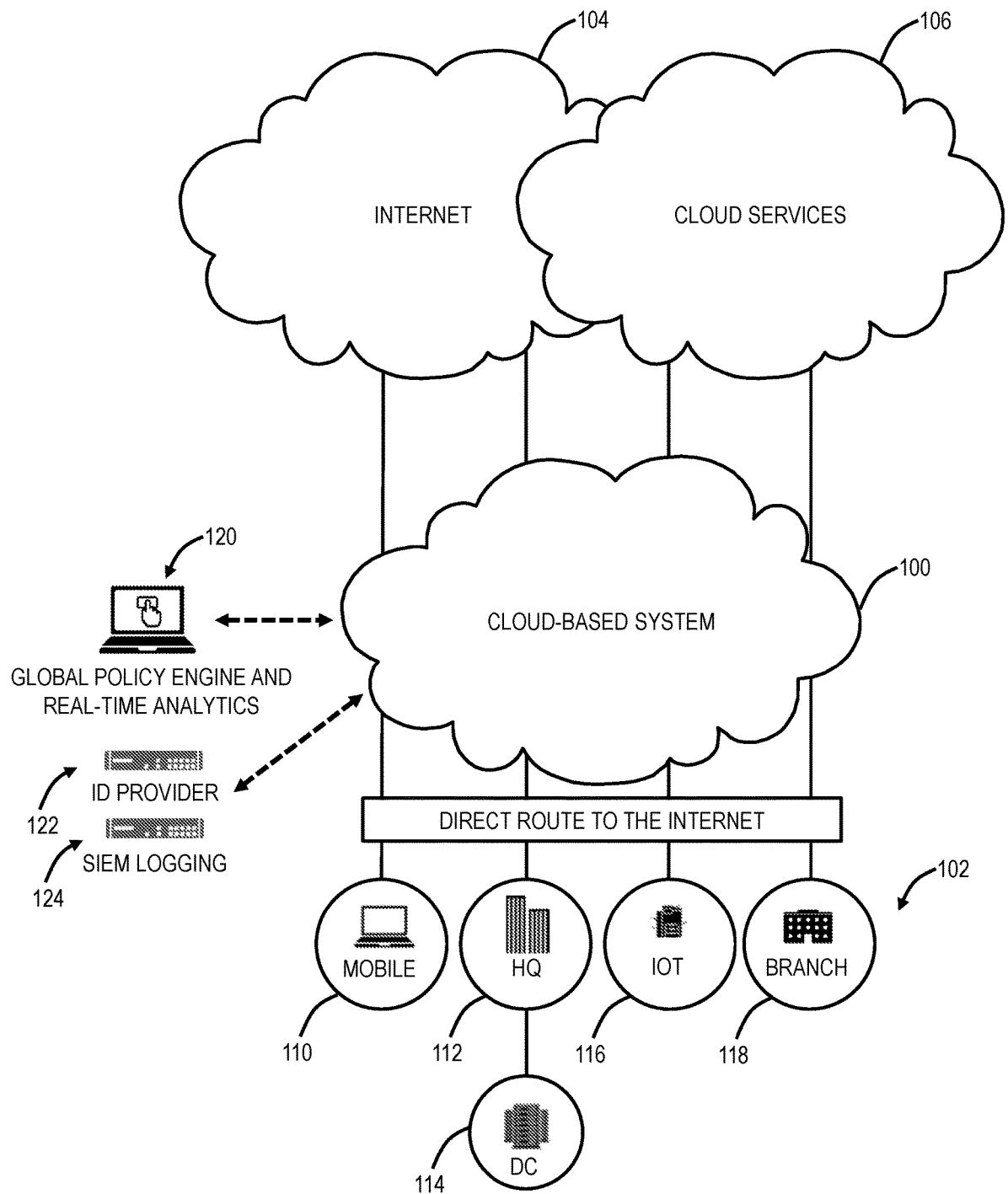
FIG. 1 is a network diagram of a cloud-based system offering security as a service.

FIG. 1 is a network diagram of a cloud-based system 100 offering security as a service. Specifically, the cloud-based system 100 can offer a Secure Internet and Web Gateway as a service to various users 102, as well as other cloud services. In this manner, the cloud-based system 100 is located between the users 102 and the Internet as well as any cloud services 106 (or applications) accessed by the users 102. As such, the cloud-based system 100 provides inline monitoring inspecting traffic between the users 102, the Internet 104, and the cloud services 106, including Secure Sockets Layer (SSL) traffic. The cloud-based system 100 can offer access control, threat prevention, data protection, etc. The access control can include a cloud-based firewall, cloud-based intrusion detection, Uniform Resource Locator (URL) filtering, bandwidth control, Domain Name System (DNS) filtering, etc. Threat prevention can include cloud-based intrusion prevention, protection against advanced threats (malware, spam, Cross-Site Scripting (XSS), phishing, etc.), cloud-based sandbox, antivirus, DNS security, etc. The data protection can include Data Loss Prevention (DLP), cloud application security such as via a Cloud Access Security Broker (CASB), file type control, etc.

The cloud-based firewall can provide Deep Packet Inspection (DPI) and access controls across various ports and protocols as well as being application and user aware. The URL filtering can block, allow, or limit website access based on policy for a user, group of users, or entire organization, including specific destinations or categories of URLs (e.g., gambling, social media, etc.). The bandwidth control can enforce bandwidth policies and prioritize critical applications such as relative to recreational traffic. DNS filtering can control and block DNS requests against known and malicious destinations.

The cloud-based intrusion prevention and advanced threat protection can deliver full threat protection against malicious content such as browser exploits, scripts, identified botnets and malware callbacks, etc. The cloud-based sandbox can block zero-day exploits (just identified) by analyzing unknown files for malicious behavior. Advantageously, the cloud-based system 100 is multi-tenant and can service a large volume of the users 102. As such, newly discovered threats can be promulgated throughout the cloud-based system 100 for all tenants practically instantaneously. The antivirus protection can include antivirus, antispyware, antimalware, etc. protection for the users 102, using signatures sourced and constantly updated. The DNS security can identify and route command-and-control connections to threat detection engines for full content inspection.

The DLP can use standard and/or custom dictionaries to continuously monitor the users 102, including compressed and/or SSL-encrypted traffic. Again, being in a cloud implementation, the cloud-based system 100 can scale this monitoring with near-zero latency on the users 102. The cloud application security can include CASB functionality to discover and control user access to known and unknown cloud services 106. The file type controls enable true file type control by the user, location, destination, etc. to determine which files are allowed or not.

The cloud-based system 100 can provide other security functions, including, for example, micro-segmentation, workload segmentation, API security, Cloud Security Posture Management (CSPM), user identity management, and the like. That is, the cloud-based system 100 provides a network architecture that enables delivery of any cloud-based security service, including emerging frameworks.

Figure 5:
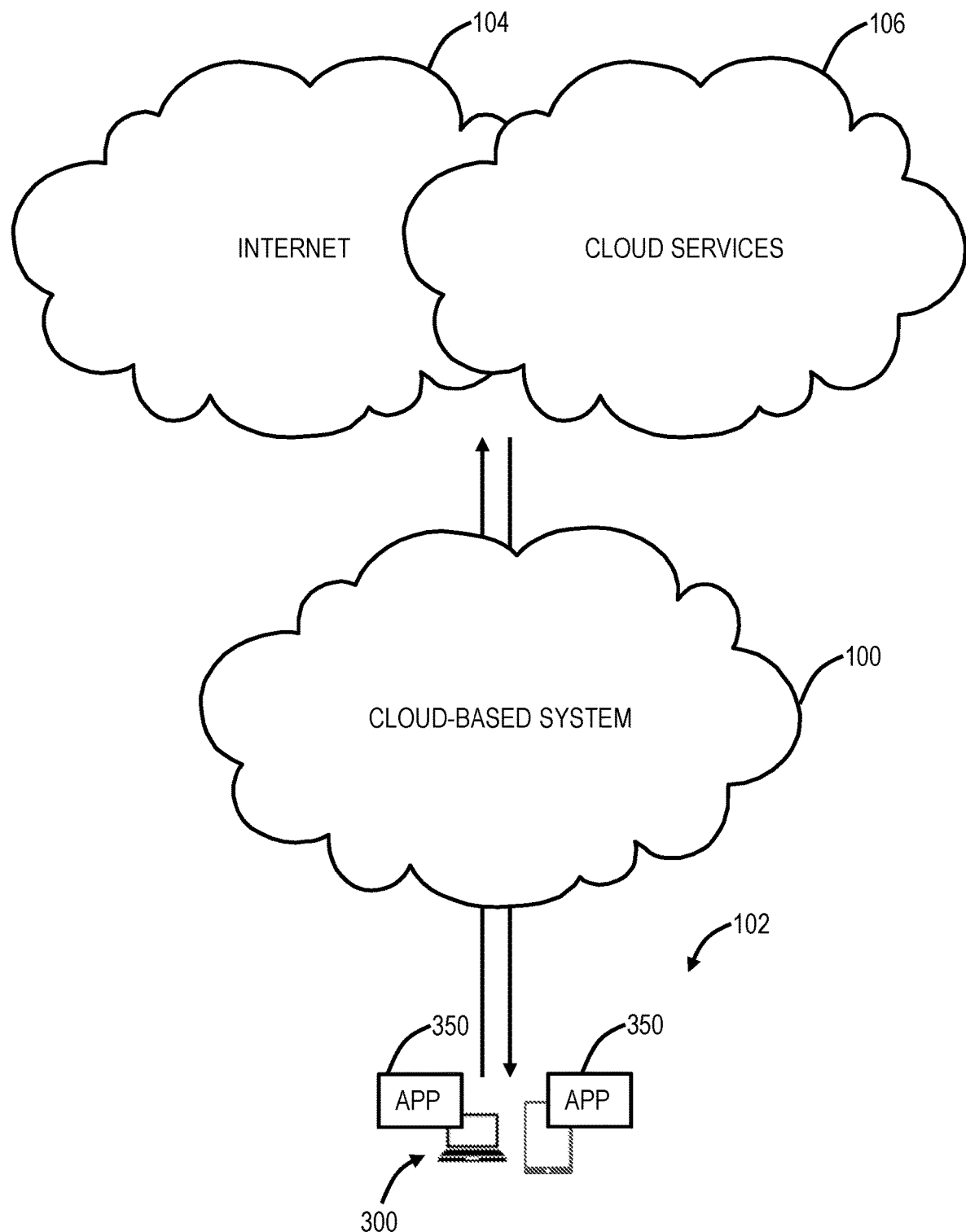
FIG. 5 is a network diagram of the cloud-based system illustrating an application on user devices with users configured to operate through the cloud-based system.

For illustration purposes, the users 102 of the cloud-based system 100 can include a mobile device 110, a headquarters (HQ) 112 which can include or connect to a data center (DC) 114, Internet of Things (IoT) devices 116, a branch office/remote location 118, etc., and each includes one or more user devices (an example user device 300 (User Equipment (UE)) is illustrated in FIG. 5). The devices 110, 116, and the locations 112, 114, 118 are shown for illustrative purposes, and those skilled in the art will recognize there are various access scenarios and other users 102 for the cloud-based system 100, all of which are contemplated herein. The users 102 can be associated with a tenant, which may include an enterprise, a corporation, an organization, etc. That is, a tenant is a group of users who share a common access with specific privileges to the cloud-based system 100, a cloud service, etc. In an embodiment, the headquarters 112 can include an enterprise's network with resources in the data center 114. The mobile device 110 can be a so-called road warrior, i.e., users that are off-site, on-the-road, etc. Those skilled in the art will recognize a user 102 has to use a corresponding user device 300 for accessing the cloud-based system 100 and the like, and the description herein may use the user 102 and/or the user device 300 interchangeably.

Further, the cloud-based system 100 can be multi-tenant, with each tenant having its own users 102 and configuration, policy, rules, etc. One advantage of the multi-tenancy and a large volume of users is the zero-day/zero-hour protection in that a new vulnerability can be detected and then instantly remediated across the entire cloud-based system 100. The same applies to policy, rule, configuration, etc. changes-they are instantly remediated across the entire cloud-based system 100. As well, new features in the cloud-based system 100 can also be rolled up simultaneously across the user base, as opposed to selective and time-consuming upgrades on every device at the locations 112, 114, 118, and the devices 110, 116.

Logically, the cloud-based system 100 can be viewed as an overlay network between users (at the locations 112, 114, 118, and the devices 110, 116) and the Internet 104 and the cloud services 106. Previously, the IT deployment model included enterprise resources and applications stored within the data center 114 (i.e., physical devices) behind a firewall (perimeter), accessible by employees, partners, contractors, etc. on-site or remote via Virtual Private Networks (VPNs), etc. The cloud-based system 100 is replacing the conventional deployment model. The cloud-based system 100 can be used to implement these services in the cloud without requiring the physical devices and management thereof by enterprise IT administrators. As an ever-present overlay network, the cloud-based system 100 can provide the same functions as the physical devices and/or appliances regardless of geography or location of the users 102, as well as independent of platform, operating system, network access technique, network access provider, etc.

There are various techniques to forward traffic between the users 102 at the locations 112, 114, 118, and via the devices 110, 116, and the cloud-based system 100. Typically, the locations 112, 114, 118 can use tunneling where all traffic is forward through the cloud-based system 100. For example, various tunneling protocols are contemplated, such as GRE, L2TP, IPsec, customized tunneling protocols, etc. The devices 110, 116, when not at one of the locations 112, 114, 118 can use a local application that forwards traffic, a proxy such as via a Proxy Auto-Config (PAC) file, and the like. An application of the local application is the application 350 described in detail herein as a connector application. A key aspect of the cloud-based system 100 is all traffic between the users 102 and the Internet 104 or the cloud services 106 is via the cloud-based system 100. As such, the cloud-based system 100 has visibility to enable various functions, all of which are performed off the user device in the cloud.

The cloud-based system 100 can also include a management system 120 for tenant access to provide global policy and configuration as well as real-time analytics. This enables IT administrators to have a unified view of user activity, threat intelligence, application usage, etc. For example, IT administrators can drill-down to a per-user level to understand events and correlate threats, to identify compromised devices, to have application visibility, and the like. The cloud-based system 100 can further include connectivity to an Identity Provider (IDP) 122 for authentication of the users 102 and to a Security Information and Event Management (SIEM) system 124 for event logging. The system 124 can provide alert and activity logs on a per-user 102 basis.

Figure 2:
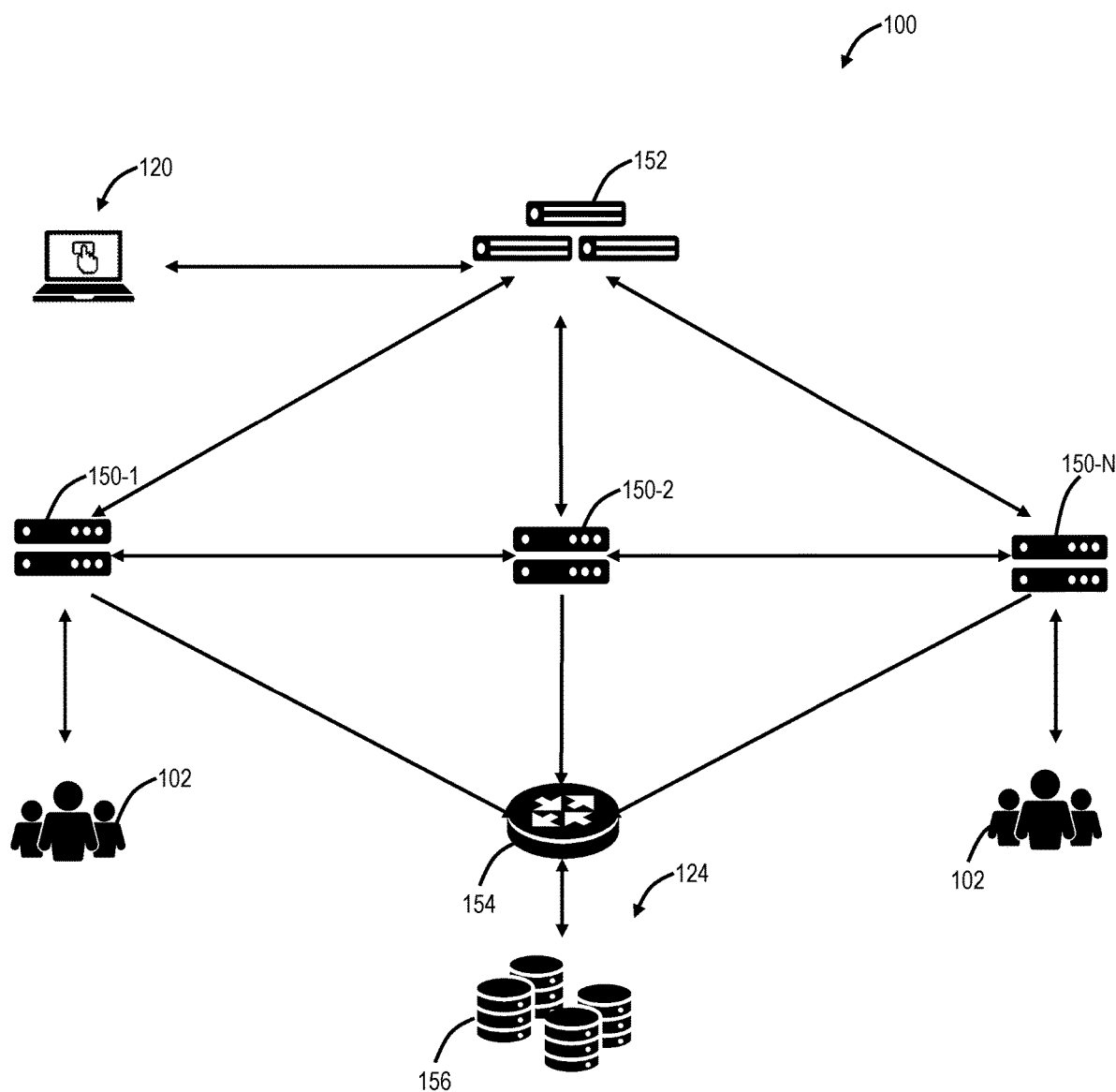
FIG. 2 is a network diagram of an example implementation of the cloud-based system.
Figure 4:
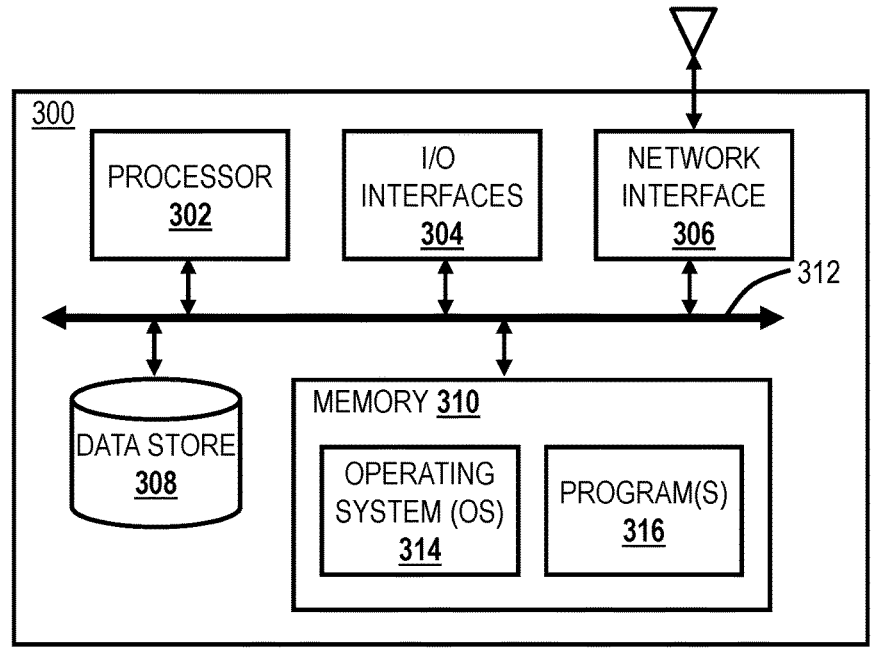

FIG. 2 is a network diagram of an example implementation of the cloud-based system 100. In an embodiment, the cloud-based system 100 includes a plurality of enforcement nodes (EN) 150, labeled as enforcement nodes 150-1, 150-2, 150-N, interconnected to one another and interconnected to a central authority (CA) 152. Note, the nodes 150 are called "enforcement" nodes 150 but they can be simply referred to as nodes 150 in the cloud-based system 100. Also, the nodes 150 can be referred to as service edges. The nodes 150 and the central authority 152, while described as nodes, can include one or more servers, including physical servers, virtual machines (VM) executed on physical hardware, etc. An example of a server is illustrated in FIG. 4. The cloud-based system 100 further includes a log router 154 that connects to a storage cluster 156 for supporting log maintenance from the enforcement nodes 150. The central authority 152 provide centralized policy, real-time threat updates, etc. and coordinates the distribution of this data between the enforcement nodes 150. The enforcement nodes 150 provide an onramp to the users 102 and are configured to execute policy, based on the central authority 152, for each user 102. The enforcement nodes 150 can be geographically distributed, and the policy for each user 102 follows that user 102 as he or she connects to the nearest (or other criteria) enforcement node 150. Of note, the cloud-based system is an external system meaning it is separate from the tenant's private networks (enterprise networks) as well as from networks associated with the devices 110, 116, and locations 112, 118.

The enforcement nodes 150 are full-featured secure internet gateways that provide integrated internet security. They inspect all web traffic bi-directionally for malware and enforce security, compliance, and firewall policies, as described herein, as well as various additional functionality. In an embodiment, each enforcement node 150 has two main modules for inspecting traffic and applying policies: a web module and a firewall module. The enforcement nodes 150 are deployed around the world and can handle hundreds of thousands of concurrent users with millions of concurrent sessions. Because of this, regardless of where the users 102 are, they can access the Internet 104 from any device, and the enforcement nodes 150 protect the traffic and apply corporate policies. The enforcement nodes 150 can implement various inspection engines therein, and optionally, send sandboxing to another system. The enforcement nodes 150 include significant fault tolerance capabilities, such as deployment in active-active mode to ensure availability and redundancy as well as continuous monitoring.

In an embodiment, customer traffic is not passed to any other component within the cloud-based system 100, and the enforcement nodes 150 can be configured never to store any data to disk. Packet data is held in memory for inspection and then, based on policy, is either forwarded or dropped. Log data generated for every transaction is compressed, tokenized, and exported over secure Transport Layer Security (TLS) connections to the log routers 154 that direct the logs to the storage cluster 156, hosted in the appropriate geographical region, for each organization. In an embodiment, all data destined for or received from the Internet is processed through one of the enforcement nodes 150. In another embodiment, specific data specified by each tenant, e.g., only email, only executable files, etc., is processed through one of the enforcement nodes 150.

Each of the enforcement nodes 150 may generate a decision vector $D=[d1, d2, \ldots, dn]$ for a content item of one or more parts $C=[c1, c2, \ldots, cm]$. Each decision vector may identify a threat classification, e.g., clean, spyware, malware, undesirable content, innocuous, spam email, unknown, etc. For example, the output of each element of the decision vector D may be based on the output of one or more data inspection engines. In an embodiment, the threat classification may be reduced to a subset of categories, e.g., violating, non-violating, neutral, unknown. Based on the subset classification, the enforcement node 150 may allow the distribution of the content item, preclude distribution of the content item, allow distribution of the content item after a cleaning process, or perform threat detection on the content item. In an embodiment, the actions taken by one of the enforcement nodes 150 may be determinative on the threat classification of the content item and on a security policy of the tenant to which the content item is being sent from or from which the content item is being requested by. A content item is violating if, for any part $C=[c1, c2, \ldots, cm]$ of the content item, at any of the enforcement nodes 150, any one of the data inspection engines generates an output that results in a classification of "violating."

The central authority 152 hosts all customer (tenant) policy and configuration settings. It monitors the cloud and provides a central location for software and database updates and threat intelligence. Given the multi-tenant architecture, the central authority 152 is redundant and backed up in multiple different data centers. The enforcement nodes 150 establish persistent connections to the central authority 152 to download all policy configurations. When a new user connects to an enforcement node 150, a policy request is sent to the central authority 152 through this connection. The central authority 152 then calculates the policies that apply to that user 102 and sends the policy to the enforcement node 150 as a highly compressed bitmap.

The policy can be tenant-specific and can include access privileges for users, websites and/or content that is disallowed, restricted domains, DLP dictionaries, etc. Once downloaded, a tenant's policy is cached until a policy change is made in the management system 120. The policy can be tenant-specific and can include access privileges for users, websites and/or content that is disallowed, restricted domains, DLP dictionaries, etc. When this happens, all of the cached policies are purged, and the enforcement nodes 150 request the new policy when the user 102 next makes a request. In an embodiment, the enforcement nodes 150 exchange "heartbeats" periodically, so all enforcement nodes 150 are informed when there is a policy change. Any enforcement node 150 can then pull the change in policy when it sees a new request.

The cloud-based system 100 can be a private cloud, a public cloud, a combination of a private cloud and a public cloud (hybrid cloud), or the like. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "Software as a Service" (SaaS) is sometimes used to describe application programs offered through cloud computing. A common shorthand for a provided cloud computing service (or even an aggregation of all existing cloud services) is "the cloud." The cloud-based system 100 is illustrated herein as an example embodiment of a cloud-based system, and other implementations are also contemplated.

As described herein, the terms cloud services and cloud applications may be used interchangeably. The cloud service 106 is any service made available to users on-demand via the Internet, as opposed to being provided from a company's on-premises servers. A cloud application, or cloud app, is a software program where cloud-based and local components work together. The cloud-based system 100 can be utilized to provide example cloud services, including Zscaler Internet Access (ZIA), Zscaler Private Access (ZPA), and Zscaler Digital Experience (ZDX), all from Zscaler, Inc. (the assignee and applicant of the present application). Also, there can be multiple different cloud-based systems 100, including ones with different architectures and multiple cloud services. The ZIA service can provide the access control, threat prevention, and data protection described above with reference to the cloud-based system 100. ZPA can include access control, microservice segmentation, etc.

The ZDX service can provide monitoring of user experience, e.g., Quality of Experience (QoE), Quality of Service (QOS), etc., in a manner that can gain insights based on continuous, inline monitoring. For example, the ZIA service can provide a user with Internet Access, and the ZPA service can provide a user with access to enterprise resources instead of traditional Virtual Private Networks (VPNs), namely ZPA provides Zero Trust Network Access (ZTNA). Those of ordinary skill in the art will recognize various other types of cloud services 106 are also contemplated. Also, other types of cloud architectures are also contemplated, with the cloud-based system 100 presented for illustration purposes.

§ 1.1 Private Nodes Hosted by Tenants or Service Providers

The nodes 150 that service multi-tenant users 102 may be located in data centers. These nodes 150 can be referred to as public nodes 150 or public service edges. In embodiment, the nodes 150 can be located on-premises with tenants (enterprise) as well as service providers. These nodes can be referred to as private nodes 150 or private service edges. In operation, these private nodes 150 can perform the same functions as the public nodes 150, can communicate with the central authority 152, and the like. In fact, the private nodes 150 can be considered in the same cloud-based system 100 as the public nodes 150, except located on-premises. When a private node 150 is located in an enterprise network, the private node 150 can have a single tenant corresponding to the enterprise; of course, the cloud-based system 100 is still multi-tenant, but these particular nodes are serving only a single tenant. When a private node 150 is located in a service provider's network, the private node 150 can be multi-tenant for customers of the service provider. Those skilled in the art will recognize various architectural approaches are contemplated. The cloud-based system 100 is a logical construct providing a security service.

§ 2.0 User Device Application for Traffic Forwarding and Monitoring

Figure 3:
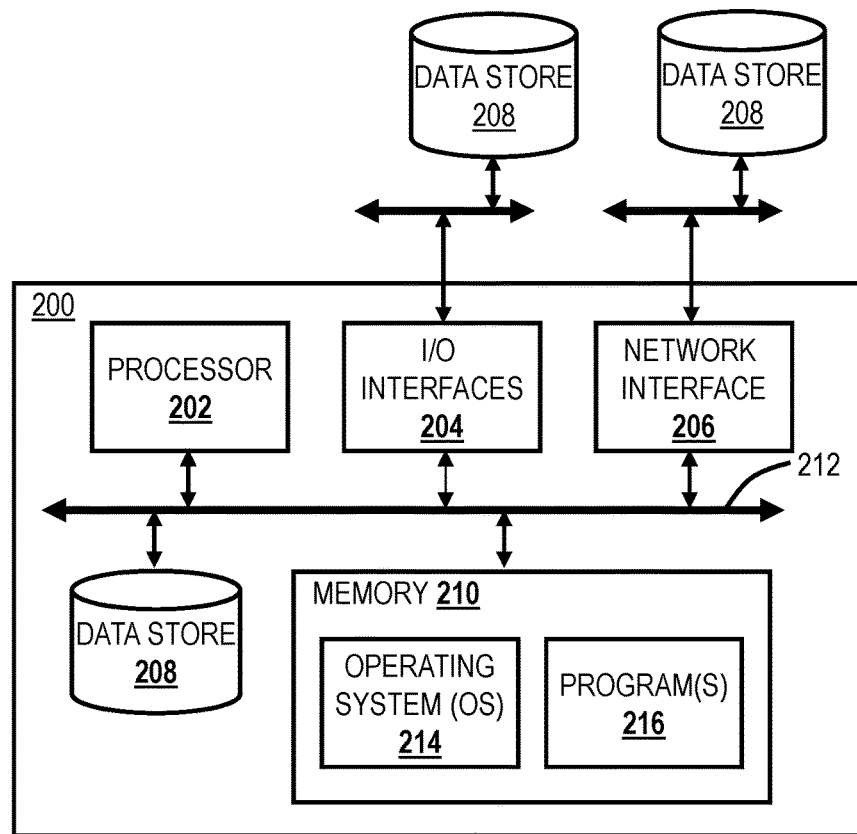

FIG. 3 is a network diagram of the cloud-based system 100 illustrating an application 350 on user devices 300 with users 102 configured to operate through the cloud-based system 100. Different types of user devices 300 are proliferating, including Bring Your Own Device (BYOD) as well as IT-managed devices. The conventional approach for a user device 300 to operate with the cloud-based system 100 as well as for accessing enterprise resources includes complex policies, VPNs, poor user experience, etc. The application 350 can automatically forward user traffic with the cloud-based system 100 as well as ensuring that security and access policies are enforced, regardless of device, location, operating system, or application. The application 350 automatically determines if a user 102 is looking to access the open Internet 104, a SaaS app, or an internal app running in public, private, or the datacenter and routes mobile traffic through the cloud-based system 100. The application 350 can support various cloud services, including ZIA, ZPA, ZDX, etc., allowing the best-in-class security with zero trust access to internal apps. As described herein, the application 350 can also be referred to as a connector application.

The application 350 is configured to auto-route traffic for seamless user experience. This can be protocol as well as application-specific, and the application 350 can route traffic with a nearest or best fit enforcement node 150. Further, the application 350 can detect trusted networks, allowed applications, etc. and support secure network access. The application 350 can also support the enrollment of the user device 300 prior to accessing applications. The application 350 can uniquely detect the users 102 based on fingerprinting the user device 300, using criteria like device model, platform, operating system, etc. The application 350 can support Mobile Device Management (MDM) functions, allowing IT personnel to deploy and manage the user devices 300 seamlessly. This can also include the automatic installation of client and SSL certificates during enrollment. Finally, the application 350 provides visibility into device and app usage of the user 102 of the user device 300.

The application 350 supports a secure, lightweight tunnel between the user device 300 and the cloud-based system 100. For example, the lightweight tunnel can be HTTP-based. With the application 350, there is no requirement for PAC files, an IPsec VPN, authentication cookies, or user 102 setup.

§ 3.0 Example Server Architecture

FIG. 4 is a block diagram of a server 200, which may be used in the cloud-based system 100, in other systems, or standalone. For example, the enforcement nodes 150 and the central authority 152 may be formed as one or more of the servers 200. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 4 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104. The network interface 206 may include, for example, an Ethernet card or adapter or a Wireless Local Area Network (WLAN) card or adapter. The network interface 206 may include address, control, and/or data connections to enable appropriate communications on the network.

A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof.

Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

§ 4.0 Example User Device Architecture

FIG. 5 is a block diagram of a user device 300, which may be used with the cloud-based system 100 or the like. Specifically, the user device 300 can form a device used by one of the users 102, and this may include common devices such as laptops, smartphones, tablets, netbooks, personal digital assistants, MP3 players, cell phones, e-book readers, IoT devices, servers, desktops, printers, televisions, streaming media devices, and the like. The user device 300 can be a digital device that, in terms of hardware architecture, generally includes a processor 302, I/O interfaces 304, a network interface 306, a data store 308, and memory 310. It should be appreciated by those of ordinary skill in the art that FIG. 5 depicts the user device 300 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the user device 300, a semiconductor-based microprocessor (in the form of a microchip or chipset), or generally any device for executing software instructions. When the user device 300 is in operation, the processor 302 is configured to execute software stored within the memory 310, to communicate data to and from the memory 310, and to generally control operations of the user device 300 pursuant to the software instructions. In an embodiment, the processor 302 may include a mobile optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a Liquid Crystal Display (LCD), touch screen, and the like.

The network interface 306 enables wireless communication to an external access device or network. Any number of suitable wireless data communication protocols, techniques, or methodologies can be supported by the network interface 306, including any protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another but can be accessed by the processor 302. The software in memory 310 can include one or more software programs, each of which includes an ordered listing of executable instructions for implementing logical functions. In the example of FIG. 3, the software in the memory 310 includes a suitable operating system 314 and programs 316. The operating system 314 essentially controls the execution of other computer programs and provides scheduling, input-output control, file and data management, memory management, and communication control and related services. The programs 316 may include various applications, add-ons, etc. configured to provide end user functionality with the user device 300. For example, example programs 316 may include, but not limited to, a web browser, social networking applications, streaming media applications, games, mapping and location applications, electronic mail applications, financial applications, and the like. In a typical example, the end-user typically uses one or more of the programs 316 along with a network such as the cloud-based system 100.

§ 5.0 Zero Trust Network Access Using the Cloud-Based System

Figure 6:
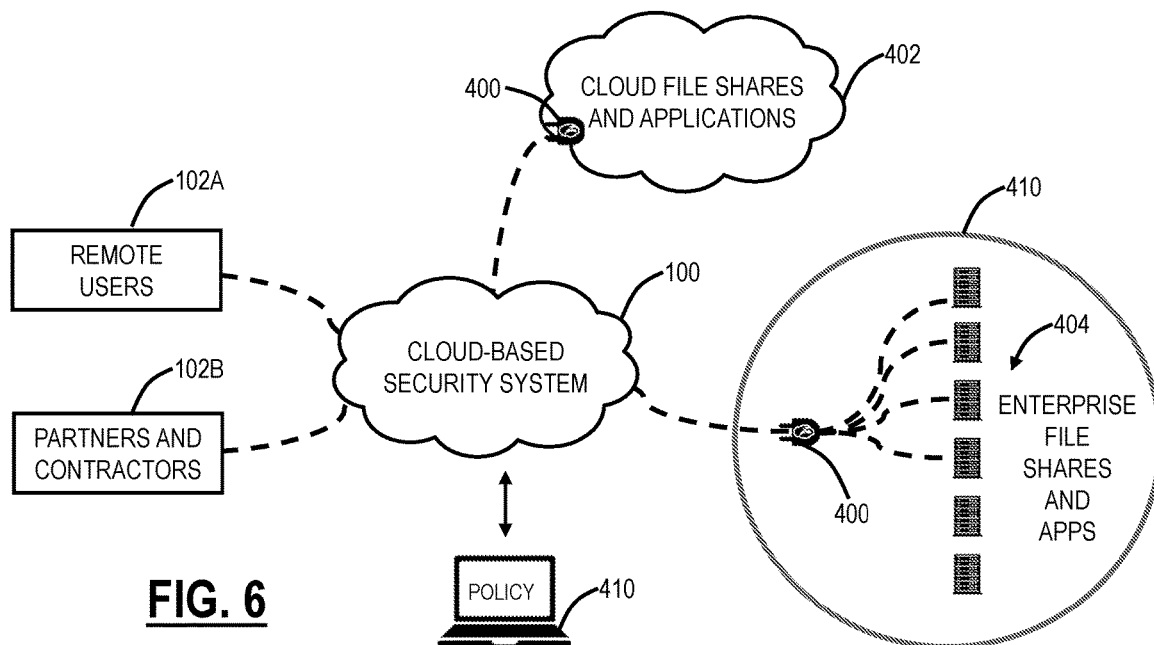
FIG. 6 is a network diagram of a Zero Trust Network Access (ZTNA) application utilizing the cloud-based system of FIGS. 1 and 2.

FIG. 6 is a network diagram of a Zero Trust Network Access (ZTNA) application utilizing the cloud-based system 100. For ZTNA, the cloud-based system 100 can dynamically create a connection through a secure tunnel between an endpoint (e.g., users 102A, 102B) that are remote and an on-premises connector 400 that is either located in cloud file shares and applications 402 and/or in an enterprise network 410 that includes enterprise file shares and applications 404. The connection between the cloud-based system 100 and on-premises connector 400 is dynamic, on-demand, and orchestrated by the cloud-based system 100. A key feature is its security at the edge—there is no need to punch any holes in the existing on-premises firewall. The connector 400 inside the enterprise (on-premises) "dials out" and connects to the cloud-based system 100 as if too were an endpoint. This on-demand dial-out capability and tunneling authenticated traffic back to the enterprise is a key differentiator for ZTNA. Also, this functionality can be implemented in part by the application 350 on the user device 300. Also, the applications 402, 404 can include B2B applications. Note, the difference between the applications 402, 404 is the applications 402 are hosted in the cloud, whereas the applications 404 are hosted on the enterprise network 410. The B2B service described herein contemplates use with either or both of the applications 402, 404.

The paradigm of virtual private access systems and methods is to give users network access to get to an application and/or file share, not to the entire network. If a user is not authorized to get the application, the user should not be able even to see that it exists, much less access it. The virtual private access systems and methods provide an approach to deliver secure access by decoupling applications 402, 404 from the network, instead of providing access with a connector 400, in front of the applications 402, 404, an application on the user device 300, a central authority 152 to push policy, and the cloud-based system 100 to stitch the applications 402, 404 and the software connectors 400 together, on a per-user, per-application basis.

With the virtual private access, users can only see the specific applications 402, 404 allowed by the central authority 152. Everything else is "invisible" or "dark" to them. Because the virtual private access separates the application from the network, the physical location of the application 402, 404 becomes irrelevant-if applications 402, 404 are located in more than one place, the user is automatically directed to the instance that will give them the best performance. The virtual private access also dramatically reduces configuration complexity, such as policies/firewalls in the data centers. Enterprises can, for example, move applications to Amazon Web Services or Microsoft Azure, and take advantage of the elasticity of the cloud, making private, internal applications behave just like the marketing leading enterprise applications. Advantageously, there is no hardware to buy or deploy because the virtual private access is a service offering to end-users and enterprises.

§ 6.0 Digital Experience Monitoring

Figure 7:
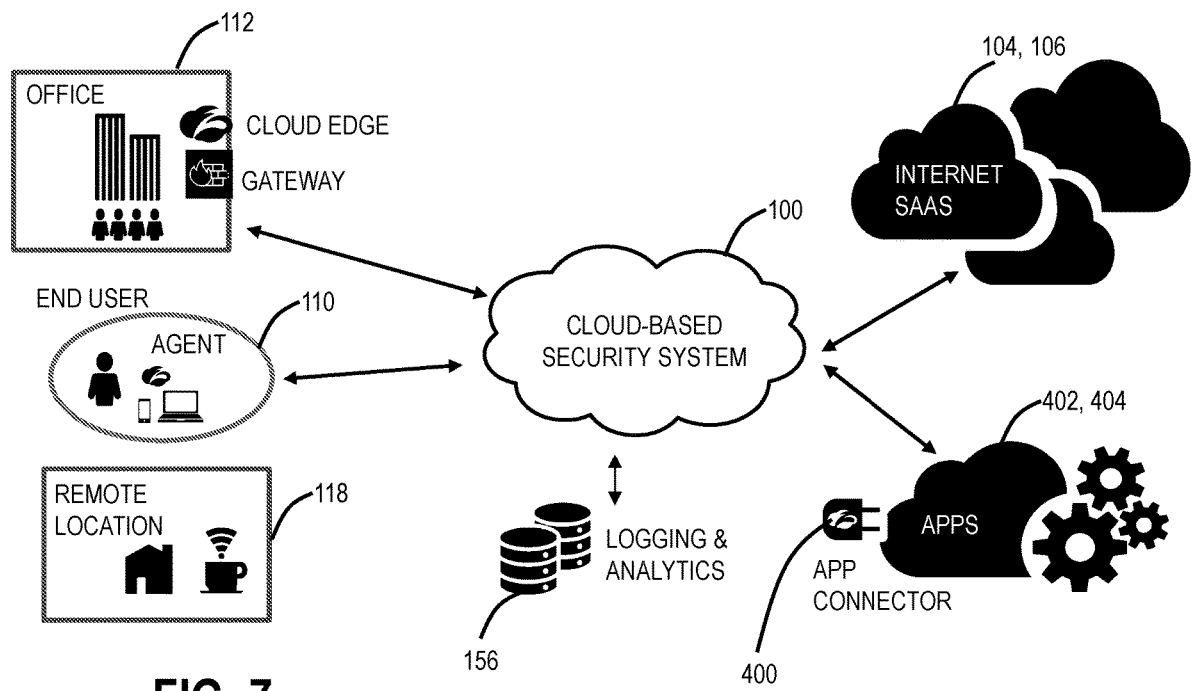
FIG. 7 is a network diagram of the cloud-based system of FIGS. 1 and 2 in an application of digital experience monitoring.

FIG. 7 is a network diagram of the cloud-based system 100 in an application of digital experience monitoring. Here, the cloud-based system 100 providing security as a service as well as ZTNA, can also be used to provide real-time, continuous digital experience monitoring, as opposed to conventional approaches (synthetic probes). A key aspect of the architecture of the cloud-based system 100 is the inline monitoring. This means data is accessible in real-time for individual users from end-to-end. As described herein, digital experience monitoring can include monitoring, analyzing, and improving the digital user experience.

The cloud-based system 100 connects users 102 at the locations 110, 112, 118 to the applications 402, 404, the Internet 104, the cloud services 106, etc. The inline, end-to-end visibility of all users enables digital experience monitoring. The cloud-based system 100 can monitor, diagnose, generate alerts, and perform remedial actions with respect to network endpoints, network components, network links, etc. The network endpoints can include servers, virtual machines, containers, storage systems, or anything with an IP address, including the Internet of Things (IoT), cloud, and wireless endpoints. With these components, these network endpoints can be monitored directly in combination with a network perspective. Thus, the cloud-based system 100 provides a unique architecture that can enable digital experience monitoring, network application monitoring, infrastructure component interactions, etc. Of note, these various monitoring aspects require no additional components—the cloud-based system 100 leverages the existing infrastructure to provide this service.

Again, digital experience monitoring includes the capture of data about how end-to-end application availability, latency, and quality appear to the end user from a network perspective. This is limited to the network traffic visibility and not within components, such as what application performance monitoring can accomplish. Networked application monitoring provides the speed and overall quality of networked application delivery to the user in support of key business activities. Infrastructure component interactions include a focus on infrastructure components as they interact via the network, as well as the network delivery of services or applications. This includes the ability to provide network path analytics.

The cloud-based system 100 can enable real-time performance and behaviors for troubleshooting in the current state of the environment, historical performance and behaviors to understand what occurred or what is trending over time, predictive behaviors by leveraging analytics technologies to distill and create actionable items from the large dataset collected across the various data sources, and the like. The cloud-based system 100 includes the ability to directly ingest any of the following data sources network device-generated health data, network device-generated traffic data, including flow-based data sources inclusive of NetFlow and IPFIX, raw network packet analysis to identify application types and performance characteristics, HTTP request metrics, etc. The cloud-based system 100 can operate at 10 gigabits (10G) Ethernet and higher at full line rate and support a rate of 100,000 or more flows per second or higher.

The applications 402, 404 can include enterprise applications, Office 365, Salesforce, Skype, Google apps, internal applications, etc. These are critical business applications where user experience is important. The objective here is to collect various data points so that user experience can be quantified for a particular user, at a particular time, for purposes of analyzing the experience as well as improving the experience. In an embodiment, the monitored data can be from different categories, including application-related, network-related, device-related (also can be referred to as endpoint-related), protocol-related, etc. Data can be collected at the application 350 or the cloud edge to quantify user experience for specific applications, i.e., the application-related and device-related data. The cloud-based system 100 can further collect the network-related and the protocol-related data (e.g., Domain Name System (DNS) response time).

Application-Related Data

| | |
|---|---|
| Page Load Time | Redirect count (#) |
| Page Response Time | Throughput (bps) |
| Document Object Model (DOM) Load Time | Total size (bytes) |
| Total Downloaded bytes | Page error count (#) |
| App availability (%) | Page element count by category (#) |

Network-Related Data

| | |
|---|---|
| HTTP Request metrics | Bandwidth |
| Server response time | Jitter |
| Ping packet loss (%) | Trace Route |
| Ping round trip | DNS lookup trace |
| Packet loss (%) | GRE/IPSec tunnel monitoring |
| Latency | MTU and bandwidth measurements |

Device-Related Data (Endpoint-Related Data)

| | |
|---|---|
| System details | Network (config) |
| Central Processing Unit (CPU) | Disk |
| Memory (RAM) | Processes |
| Network (interfaces) | Applications |

Metrics could be combined. For example, device health can be based on a combination of CPU, memory, etc. Network health could be a combination of Wi-Fi/LAN connection health, latency, etc. Application health could be a combination of response time, page loads, etc. The cloud-based system 100 can generate service health as a combination of CPU, memory, and the load time of the service while processing a user's request. The network health could be based on the number of network path(s), latency, packet loss, etc.

The lightweight connector 400 can also generate similar metrics for the applications 402, 404. In an embodiment, the metrics can be collected while a user is accessing specific applications that user experience is desired for monitoring. In another embodiment, the metrics can be enriched by triggering synthetic measurements in the context of an in-line transaction by the application 350 or cloud edge. The metrics can be tagged with metadata (user, time, app, etc.) and sent to a logging and analytics service for aggregation, analysis, and reporting. Further, network administrators can get UEX reports from the cloud-based system 100. Due to the inline nature and the fact the cloud-based system 100 is an overlay (in-between users and services/applications), the cloud-based system 100 enables the ability to capture user experience metric data continuously and to log such data historically. As such, a network administrator can have a long-term detailed view of the network and associated user experience.

§ 7.0 Risk Based Session Resumption

As stated previously, there has been an increase of roaming devices as users are no longer in the enterprise trusted network. For such roaming users, applications servers typically authenticate users using various forms of authentication such as username, password, and client certificates along with various forms of multifactor authentication schemes such as biometrics and one-time-passwords on the user's mobile devices. Post authentication, clients usually store a session cookie with a specific timeout generated by the server in their cache. As long as the cookie is not expired, the client will connect with the server and the server will continue to provide access to the requested resources unconditionally. This poses significant security challenges because if the timeout for the session cookie is very long, then an attacker may abuse the access. On the extreme end, if the timeout is much less for example 1 hour, then it will hamper the user experience as every hour a user will have to reauthenticate to gain access to the server resources. This problem poses a specific risk for always-on VPNs which are configured usually to authenticate once and keep it running forever, thereby allowing an authenticated user to access resources for infinity. The current disclosure overcomes this issue by proposing a risk-based session resumption and reauthentication workflow where the server will challenge the user to authenticate only if the risk score of the client requesting a resource has crossed a threshold of change. While this is distinctly useful for always-on VPNs, in practice the risk-based session resumption can be utilized universally for any long-lived Transport Layer Security (TLS) connection.

Figure 8:
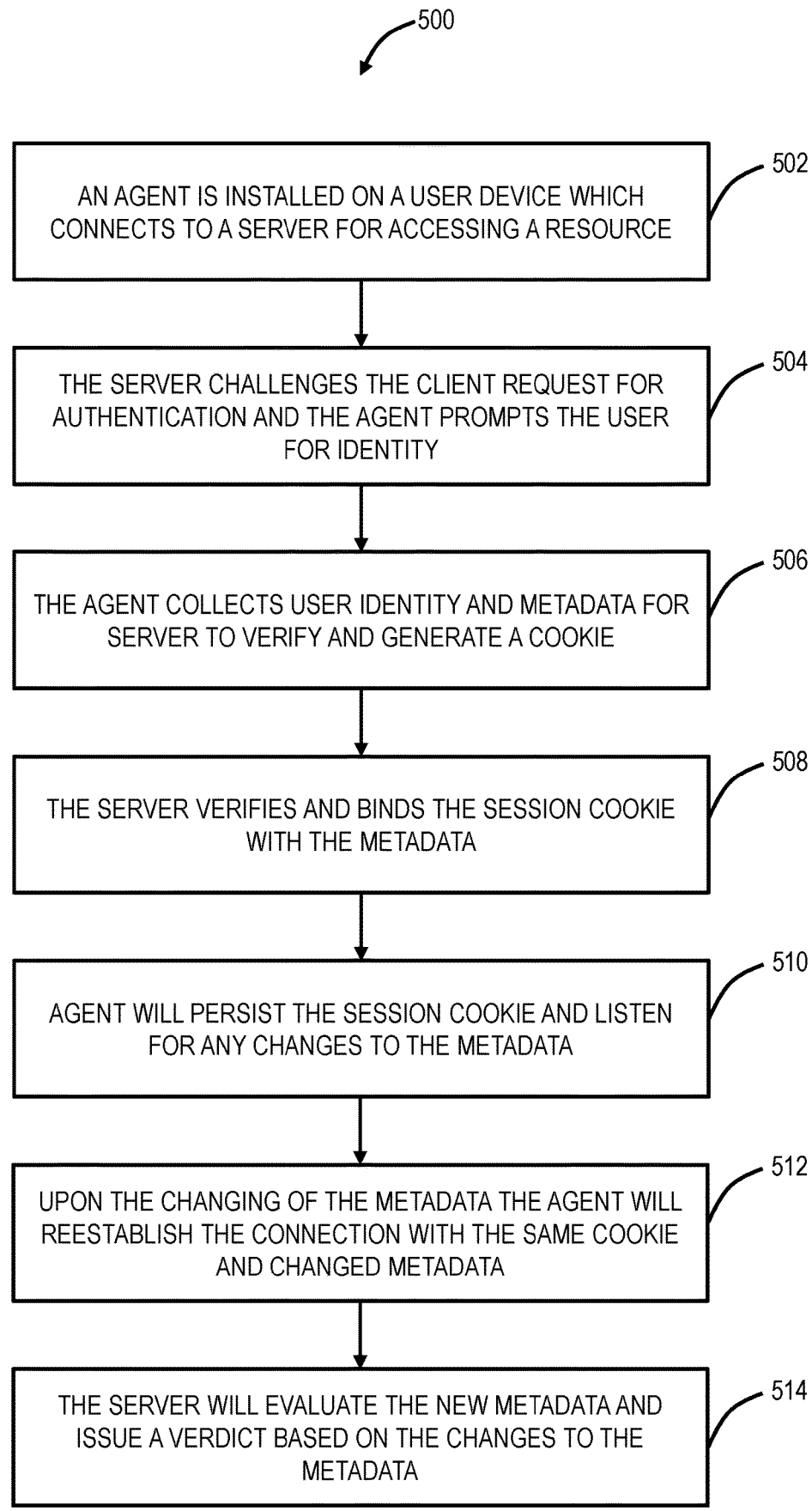
FIG. 8 is a flowchart of the risk-based session resumption process of the present disclosure.

FIG. 8 is a flowchart of the risk-based session resumption process 500 of the present disclosure. Initially an agent is installed on the device that connects to a server for accessing a resource. Specifically, the user device can form a device used by one of the users, and this may include common devices such as laptops, smartphones, tablets, netbooks, personal digital assistants, MP3 players, cell phones, e-book readers, IoT devices, servers, desktops, printers, televisions, streaming media devices, and the like. The server then challenges the client request for authentication causing the agent to prompt the user for identity. The agent collects the user identity and metadata for the server to verify and generate a cookie. The authentication request may contain user identity such as username and password as well as a SAMLResponse if the identity provider is a different entity. The authentication request may also include device metadata including OS type, OS version, device model, as well as internal and external IP address of the system, DNS server, proxy server, installed application reputation list, local user attributes, geo location, and network type such as trusted or untrusted based upon preconfigured criteria, as well as other metadata known to one of ordinary skill in the art. The authentication request may include any of the aforementioned information. The server will then verify all of the information and will bind the session cookie with the metadata. The agent will persist the session cookie in a secure location on the device and listen for any changes to the metadata. If the metadata changes in any point in time, the agent will reestablish the connection with the same cookie and the changed metadata. The server will evaluate the new metadata and issue a verdict based on the changes in the new metadata. Such verdict can be any authentication action such as allowing/resuming the session, blocking/preventing access, reauthentication request with Multi Factor Authentication (MFA), or reauthentication without MFA.

For example, if the metadata changes (i.e., the users IP address changes), the server may challenge the user to reauthenticate without MFA. Similarly, if the OS version changes then the server can challenge the user to reauthenticate with MFA. Also, if the server detects installation of a malicious application on the device using a malware database lookup, the server can block the connection. The verdict can be decided upon based on the configuration.

More specifically, this verdict can be made configurable and dependent on the enterprise sensitivity to changes in the metadata.

The present disclosure addresses the security gaps in the access control workflow of an organization while significantly enhancing the user experience. Instead of users being inquired to reauthenticate at a periodic interval, the present disclosure provides risk-based session resumption and reauthentication established on a verdict determination based on changes detected in metadata. The present disclosure not only prevents unnecessary prompts for user to authenticate again but also improves the security profile of an organization as users need to reauthenticate only if something has changed, malicious activity is detected, and there is a real risk to access control.

§ 8.0 Conclusion

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

The foregoing sections include headers for various embodiments and those skilled in the art will appreciate these various embodiments may be used in combination with one another as well as individually. Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method implemented by a user device, the method comprising steps of:
   requesting a resource, by an agent operating on the user device, from a server, the resource is associated with any of an online application and a cloud service;
   prompting the user for identity;
   receiving user entry input for the identity and metadata, and providing the user entry input and metadata to the server for an authentication request;
   receiving and storing a session cookie for the resource, wherein the user device has a session for the resource based on the session cookie;
   after authenticating the request, listening for a change in the metadata, wherein the listening occurs continuously via the agent operating in a secure location on the user device;
   responsive to the listening detecting a change in the metadata, providing the session cookie and the change in the metadata via the agent to the server; and
   receiving a response from the server based on the change in the metadata, and accessing the resource based thereon.

2. The method of claim 1, wherein the accessing the resource based thereon is based on a verdict issued by the server includes one of
   resuming the session,
   blocking the session, and
   reauthenticating the session.

3. The method of claim 2, wherein the reauthenticating the session based on the verdict issued by the server and is one of with or without one of multifactor authentication or post authentication.

4. The method of claim 1, wherein the metadata includes an internet protocol (IP) address, and wherein, when there is a change in the IP address, the response includes accessing the resource via reauthenticating the session.

5. The method of claim 1, wherein the metadata includes details related to the user device and wherein, when there is a change in the details, the response includes accessing the resource via reauthenticating the session with multifactor authentication.

6. The method of claim 1, wherein the metadata includes installed applications on the user device, and wherein the steps comprise:
   responsive to identifying, via the agent operating on the user device, a change in the installed applications on the user device, providing the session cookie and the change in the installed applications to the server; and
   receiving a response from the server based thereon.

7. The method of claim 1, wherein the metadata includes any of details related to the user device, user provided details, internet protocol (IP) address, network configuration, installed applications, installed certificates, geolocation, and network type.

8. The method of claim 7, wherein the accessing the resource based thereon includes resuming the session based on minor changes to the metadata.

9. A non-transitory computer-readable medium comprising instructions that, when executed, cause a processor to perform the steps of:
- requesting a resource, by an agent operating on a user device, from a server, the resource is associated with any of an online application and a cloud service;
- prompting the user for identity;
- receiving user entry input for the identity and metadata, and providing the user entry input and metadata to the server for an authentication request;
- receiving and storing a session cookie for the resource, wherein the user device has a session for the resource based on the session cookie;
- after authenticating the request, listening for a change in the metadata, wherein the listening occurs continuously via the agent operating in a secure location on the user device;
- responsive to the listening detecting a change in the metadata, providing the session cookie and the change in the metadata via the agent to the server; and
- receiving a response from the server based on the change in the metadata, and accessing the resource based thereon.

10. The non-transitory computer-readable medium of claim 9, wherein the accessing the resource based thereon includes one of
- resuming the session,
- blocking the session, and
- reauthenticating the session.

11. The non-transitory computer-readable medium of claim 10, wherein the reauthenticating the session is one of with or without multifactor authentication.

12. The non-transitory computer-readable medium of claim 9, wherein the metadata includes an internet protocol (IP) address, and wherein, when there is a change in the IP address, the response includes accessing the resource via reauthenticating the session.

13. The non-transitory computer-readable medium of claim 9, wherein the metadata includes details related to the user device and wherein, when there is a change in the details, the response includes accessing the resource via reauthenticating the session with multifactor authentication.

14. The non-transitory computer-readable medium of claim 9, wherein the metadata includes installed applications on the user device, and wherein the steps comprise:
- responsive to identifying, via the agent operating on the user device, a change in the installed applications on the user device, providing the session cookie and the change in the installed applications to the server; and
- receiving a response from the server based thereon.

15. The non-transitory computer-readable medium of claim 9, wherein the metadata includes any of details related to the user device, internet protocol (IP) address, network configuration, installed applications, installed certificates, geolocation, and network type.

16. The non-transitory computer-readable medium of claim 15, wherein the accessing the resource based thereon includes resuming the session based on minor changes to the metadata.

17. A user device comprising:
- a processing device;
- a memory device configured to store a computer program having instructions that, when executed, cause the processing device to perform the steps of:
  - requesting a resource, by an agent operating on the user device, from a server, the resource is associated with any of an online application and a cloud service;
  - prompting the user for identity;
  - receiving user entry input for the identity and metadata, and providing the user entry input and metadata to the server for an authentication request;
  - receiving and storing a session cookie for the resource, wherein the user device has a session for the resource based on the session cookie;
  - after authenticating the request, listening for a change in the metadata, wherein the listening occurs continuously via the agent operating in a secure location on the user device;
  - responsive to the listening detecting a change in the metadata, providing the session cookie and the change in the metadata via the agent to the server; and
  - receiving a response from the server based on the change in the metadata, and accessing the resource based thereon.

18. The server of claim 17, wherein the accessing the resource based thereon includes one of
- resuming the session,
- blocking the session, and
- reauthenticating the session.

19. The server of claim 18, wherein the metadata includes details related to the user device and wherein, when there is a change in the details, the response includes accessing the resource via reauthenticating the session with or without multifactor authentication.

20. The server of claim 17, wherein the metadata includes an internet protocol (IP) address, and wherein, when there is a change in the IP address, the response includes accessing the resource via reauthenticating the session.

* * * * *